(12) United States Patent
Liu

(10) Patent No.: US 12,002,433 B2
(45) Date of Patent: Jun. 4, 2024

(54) BRIGHTNESS ADJUSTMENT METHOD, DEVICE AND DISPLAY APPARATUS

(71) Applicant: Chipone Technology (Beijing) Co., Ltd., Beijing (CN)

(72) Inventor: Aqiang Liu, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/026,578

(22) PCT Filed: May 18, 2021

(86) PCT No.: PCT/CN2021/094429
§ 371 (c)(1),
(2) Date: Mar. 15, 2023

(87) PCT Pub. No.: WO2022/057294
PCT Pub. Date: Mar. 24, 2022

(65) Prior Publication Data
US 2023/0335069 A1  Oct. 19, 2023

(30) Foreign Application Priority Data

Sep. 15, 2020  (CN) .......................... 202010966589.6

(51) Int. Cl.
*G09G 3/00* (2006.01)
*G09G 3/20* (2006.01)
*G09G 3/34* (2006.01)
(52) U.S. Cl.
CPC ......... *G09G 3/3426* (2013.01); *G09G 3/2096* (2013.01); *G09G 2320/064* (2013.01);
(Continued)

(58) Field of Classification Search
CPC .............. G09G 3/3426; G09G 3/2096; G09G 2320/064; G09G 2354/00;
(Continued)

(56) References Cited

U.S. PATENT DOCUMENTS

2014/0210359 A1* 7/2014 Raval .................... H05B 45/38
307/31
2019/0369440 A1* 12/2019 Kuan ................... G09G 3/3611
2020/0082768 A1* 3/2020 Oh ........................ G09G 3/3291

FOREIGN PATENT DOCUMENTS

CN  107735832 A  2/2018
CN  108346399    7/2018
(Continued)

*Primary Examiner* — Michael A Faragalla
(74) *Attorney, Agent, or Firm* — Treasure IP Group, LLC

(57) ABSTRACT

Disclosed is a brightness adjustment method, a device and a display apparatus. The method comprises: acquiring a brightness adjustment instruction and a target display brightness value of a display panel, a display brightness value representing backlight brightness of the display panel; adjusting a duty cycle of the light-emitting control signal based on the target display brightness value of the display panel; driving LEDs of a corresponding row in a backlight source to emit light by the adjusted light-emitting control signal. Each time the duty cycle of the light-emitting control signal needs to be adjusted, a duty cycle of each pulse cycle of a part of N pulse cycles of the light-emitting control signal is selected for corresponding adjustment, thus backlight brightness adjustment accuracy of the display panel is effectively improved, and an adjustable range of backlight brightness of the display panel is wider.

14 Claims, 3 Drawing Sheets

(52) U.S. Cl.
CPC ... *G09G 2354/00* (2013.01); *G09G 2360/144* (2013.01); *G09G 2360/16* (2013.01)

(58) Field of Classification Search
CPC ......... G09G 2360/144; G09G 2360/16; G09G 3/32; G09G 3/3208; G09G 3/3291; G09G 3/3233; G09G 3/3266
See application file for complete search history.

(56) References Cited

FOREIGN PATENT DOCUMENTS

| | | |
|---|---|---|
| CN | 110853570 | 2/2020 |
| CN | 110853578 | 2/2020 |
| CN | 110890071 | 3/2020 |
| CN | 111210778 | 5/2020 |
| CN | 111243520 | 6/2020 |
| CN | 211237684 A | 8/2020 |
| CN | 112071274 A | 12/2020 |
| CN | 112164374 | 1/2021 |
| CN | 113516944 A | 10/2021 |
| WO | 2019183811 | 10/2019 |

\* cited by examiner

BRIGHTNESS ADJUSTMENT METHOD, DEVICE AND DISPLAY APPARATUS

CROSS-REFERENCE TO RELATED APPLICATION

The present application is a Section 371 National Stage application of International Application No. PCT/CN2021/094429, which is filed on 18 May, 2021 and published as WO 2022/057294 A1 on 24 Mar., 2022, and claims priority to Chinese patent application No. 202010966589.6, filed on Sep. 15, 2020, and entitled "Brightness Adjustment Method, Device and Display Apparatus", the specification, claims, drawings and abstract of which are incorporated herein by reference in their entireties.

FIELD OF THE DISCLOSURE

The present disclosure relates to a technical field of display, in particular to a brightness adjustment method, a device and a display apparatus.

DESCRIPTION OF THE RELATED ART

In electronic industry, backlight is a form of illumination, and is often used in LCD (Liquid Crystal Display) to increase intensity of illumination in low light source environment and brightness of a display or a liquid crystal screen. LED (Light Emitting Diode) is a solid-state semiconductor device, which can directly convert electrical energy into light energy. In recent years, traditional CCFL (Cold Cathode Fluorescent Lamp) has been gradually replaced by LED for serving as a backlight source of an LCD.

In usage of an LCD, it is necessary to adjust brightness of the LCD. In the prior art, a backlight driver is generally controlled to perform light adjustment on the backlight source, so as to adjust the brightness of the LCD, in which a pulse width modulation (PWM) waveform is usually used to control a LED driver to perform light adjustment. Controlling, by use of the PWM waveform, the LED driver to perform light adjustment is to control the LED driver periodically provide output current to the LED backlight source, so that the LED backlight source may periodically be turned on and off. Because human eyes are not sensitive to the switching between on state and off state of a light source, when the switching between on state and off state is performed at a frequency exceeding 100 Hz, the human eyes may sense an average brightness, instead of detecting that the LED light source is turned on and off. By changing a duty cycle of the PWM waveform which is input to the LED driver, a ratio between an on-state duration and an off-state duration of the LED backlight source in a cycle of the PWM waveform can be adjusted, thus achieving LCD brightness adjustment. In one frame time, the longer the low-level-voltage duration of a light-emitting control signal, the higher the brightness of the display, and the shorter the low-level-voltage duration, the lower the brightness of the display. In one frame time, in order to avoid some display problems caused by keeping a light or dark state of a pixel for too long time, usually, several pulse cycles are designed in the light-emitting control signal. In each pulse cycle, a low-voltage level indicates that pixels in a corresponding line are lit, and a high-voltage level indicates that pixels in the corresponding line are not lit. Therefore, the higher the duty cycle of the low-voltage-level duration of the light-emitting control signal, the longer the luminous time, and the higher the brightness of the corresponding display.

In an existing display driver chip, a brightness controller (BC) module is usually used to control the low-voltage-level duration of the light-emitting control signal (EM signal) to adjust screen brightness. When a display brightness value (DBV) of the display panel changes, the required low-voltage-level duration (or duty cycle) of the EM signal can be calculated by the BC module, and then an on-state duration of LED can be changed to realize adjustment on screen brightness. However, since the low-voltage-level duration of the EM signal is changed with behavioral accuracy, if a frame contains N cycles of the EM signal, each time the low-voltage-level duration of the EM signal changes by n lines, a total low-voltage-level duration of the EM signal in the current frame may change by N*n lines. When N and n are pretty large, accuracy of screen brightness adjustment performed by use of the EM signal may be very low, which leads to the phenomenon that brightness may jump too much when a brightness bar of the display is adjusted, and user experience may be affected.

Therefore, it is necessary to provide an improved technical scheme to overcome the above technical problems in the prior art.

SUMMARY

In order to solve the above technical problems, the present disclosure provides a brightness adjustment method, a device and a display apparatus, which can effectively improve backlight brightness adjustment accuracy of a display panel and provide a wider adjustable range for backlight brightness of the display panel.

According to embodiments of the present disclosure, a brightness adjustment method comprises: acquiring a brightness adjustment instruction and a target display brightness value of a display panel, the display brightness value being used to represent backlight brightness of the display panel; adjusting a duty cycle of a light-emitting control signal based on the target display brightness value of the display panel; driving LEDs of a corresponding row in a backlight source to emit light by use of the adjusted light-emitting control signal, wherein for each row of LEDs in the backlight source of the display panel, the light-emitting control signal corresponding to that row of LEDs comprises N pulse cycles; and each time the duty cycle of the light-emitting control signal needs to be adjusted, performing corresponding adjustment on a duty cycle of each pulse cycle of a selected part of the N pulse cycles of the light-emitting control signal, wherein, N is a positive integer greater than 2.

Optionally, the step of performing corresponding adjustment on the duty cycle of each pulse cycle of the selected part of the N pulse cycles of the light-emitting control signal comprises: selecting each odd-numbered pulse cycle or each even-numbered pulse cycle of the N pulse cycles of the light-emitting control signal as the selected part of the N pulse cycles of the light-emitting control signal, and performing corresponding adjustment on the duty cycle of each pulse cycle of the selected part of the N pulse cycles of the light-emitting control signal.

Optionally, the step of performing corresponding adjustment on the duty cycle of each pulse cycle of the selected part of the N pulse cycles of the light-emitting control signal comprises: selecting i-th pulse cycle to k-th pulse cycle of the N pulse cycles of the light-emitting control signal as the selected part of the N pulse cycles of the light-emitting control signal, and performing corresponding adjustment on the duty cycle of each pulse cycle of the selected part of the N pulse cycles, wherein, i is a positive integer greater than or equal to 1, k is a positive integer greater than i and less than or equal to N, and k−i is less than N−1.

Optionally, the step of performing corresponding adjustment on the duty cycle of each pulse cycle of the selected part of the N pulse cycles of the light-emitting control signal comprises: selecting a pulse cycle, which has a duty cycle less than a first threshold value or greater than a second threshold value, of the N pulse cycles of the light-emitting control signal as the selected part of the N pulse cycles of the light-emitting control signal, and performing corresponding adjustment on the duty cycle of each pulse cycle of the selected part of the N pulse cycles, wherein, a method for setting the first threshold value comprises: sorting duty cycles of the N pulse cycles in an order from high to low, and selecting a duty cycle of a j-th pulse cycle in that order as the first threshold value; a method for setting the second threshold value comprises: sorting the duty cycles of the N pulse cycles in an order from low to high, and selecting a duty cycle of a j-th pulse cycle in that order as the second threshold value, wherein, j is a positive integer less than N−1.

Optionally, the step of performing corresponding adjustment on the duty cycle of each pulse cycle of the selected part of the N pulse cycles of the light-emitting control signal comprises: randomly selecting a part of the N pulse cycles as the selected part of the N pulse cycles of the light-emitting control signal, and performing corresponding adjustment on the duty cycle of each pulse cycle of the selected part of the N pulse cycles.

Optionally, the selected part of the N pulse cycles required for corresponding adjustment and corresponding to light emitting diodes of each of adjacent rows in the backlight source are odd-numbered pulse cycles or even-numbered pulse cycles; or the selected part of the N pulse cycles required for corresponding adjustment and corresponding to one of the adjacent rows of light emitting diodes in the backlight source are odd-numbered pulse cycles, and the selected part of the N pulse cycle required for corresponding adjustment and corresponding to the other one of the adjacent rows of light emitting diodes in the backlight source are even-numbered pulse cycles.

Optionally, the selected part of the N pulse cycles required for corresponding adjustment and corresponding to light emitting diodes of each of adjacent rows in the backlight source are from i-th pulse cycle to k-th pulse cycle; or the selected part of the N pulse cycles required for corresponding adjustment and corresponding to light emitting diodes of one of the adjacent rows of light emitting diodes in the backlight source are from the i-th pulse cycle to the k-th pulse cycle, and the selected part of the N pulse cycles required for corresponding adjustment and corresponding to light emitting diodes of the other one of the adjacent rows are from (i+m)-th pulse cycle to (k+m)-th pulse cycle, where m is an integer, (i+m) is greater than or equal to 1, and (k+m) is less than or equal to N.

Optionally, the duty cycle of each pulse cycle of the selected part of the N pulse cycles for corresponding adjustment is adjusted by a same adjustment quantity.

Optionally, the step of acquiring the brightness adjustment instruction and the target display brightness value of the display panel comprises: generating the brightness adjustment instruction according to an operation instruction of a user, and taking a display brightness value set by the user as the target display brightness value of the display panel; or generating the brightness adjustment instruction according to brightness variation of external ambient light, and generating the target display brightness value of the display panel according to sensed brightness of the external ambient light.

According to embodiments of the present disclosure, a brightness adjustment device can be used to perform the brightness adjustment method as described above, wherein, when the display panel displays each frame image, for each row of light emitting diodes in the backlight source of the display panel, the light-emitting control signal received by that row comprises N pulse cycles, and N is a positive integer greater than 2. The device comprises: a processor, configured to generate a brightness adjustment instruction and a target display brightness value of the display panel; a timing controller, connected with the processor, and configured to receive the brightness adjustment instruction and the target display brightness value, and adjust the duty cycle of the outputted light-emitting control signal according to the brightness adjustment instruction and the target display brightness value; a backlight driver, connected with the controller, and configured to receive the adjusted light-emitting control signal, so as to generate a corresponding driving current, which is used to drive the backlight source to emit light, wherein, each time the duty cycle of the light-emitting control signal needs to be adjusted, corresponding adjustment is performed on a duty cycle of each pulse cycle of a selected part of the N pulse cycles of the light-emitting control signal.

Optionally, the timing controller comprises: a calculation module, configured to calculate a duty cycle of each pulse cycle of the outputted light-emitting control signal according to the target display brightness value of the display panel; a signal generation module, connected with the calculation module and configured to generate the light-emitting control signal according to a calculation result obtained by the calculation module.

Optionally, the brightness adjustment device further comprises: a memory, respectively connected with the processor and the timing controller, and configured to establish and store a mapping relationship between a duty cycle of the light-emitting control signal and a corresponding display brightness value.

A display apparatus according to embodiments of the present disclosure includes a brightness adjustment device as described above.

The present disclosure provides a brightness adjustment method, a device and a display apparatus, and has following advantages: when a duty cycle of a light-emitting control signal received by a backlight source of the display panel is adjusted based on a brightness adjustment instruction and a target display brightness value to realize brightness adjustment of the display panel, a duty cycle of each of only a part of the N pulse cycles of the light-emitting control signal is adjusted each time, therefore, under a condition that the number of lines of light emitting diodes in the backlight source to be adjusted is unchanged, compared with the prior art, the number of pulse cycles to be adjusted corresponding to each row can be reduced, and then an adjustment quantity corresponding to an overall brightness of the whole display panel can be correspondingly reduced every time a duty cycle of a unit of light-emitting control signal is adjusted, thus effectively improving backlight brightness adjustment accuracy of the display panel. At the same time, since only the duty cycle of each pulse cycle of the part (may include more than 1 pulse cycle) of the N pulse cycles is adjusted each time, an adjustable range of the backlight brightness of the display panel can be wider, compared with a situation that only a duty cycle of a single pulse cycle in one frame is changed.

In some embodiments, the odd-numbered pulse cycles or the even-numbered pulse cycles are taken as the part of the N pulse cycles of the light-emitting control signal to be adjusted, thus stability of subsequent driving based on the light-emitting control signal can be ensured, and further, since the frequency of the light-emitting control signal is repeatedly dithered and changed in odd and even cycles within one frame period, electromagnetic interference can be effectively suppressed from the source.

In some embodiments, it is set that the part of the light-emitting control signal to be adjusted are continuous pulse cycles, thus times of repeatedly adjusting the duty cycle can be reduced correspondingly, and adjustment difficulty and power consumption can also be reduced.

If the duty cycle of each pulse cycle of the part of the N pulse cycles of the light-emitting control signal needs to be increased, it may be preferable to select and adjust a pulse cycle with a low duty cycle, and if the duty cycle of each pulse cycle of the part of the N pulse cycles of the light-emitting control signal needs to be reduced, it may be preferable to select and adjust a pulse cycle with a high duty cycle, which is beneficial to maintain balance among N pulse cycles of the light-emitting control signal in one frame period, thereby improving driving quality of the backlight source in the display panel and enhancing display effect.

It should be noted that the above general description and the following detailed description are exemplary and explanatory only and are not intended to limit the present invention.

BRIEF DESCRIPTION OF THE DRAWINGS

The above and other objects, features and advantages of the present invention will become more apparent from the following description of embodiments of the present disclosure with reference to the accompanying drawings, in which.

DETAILED DESCRIPTION OF EMBODIMENTS OF THE DISCLOSURE

For making the present disclosure easily understood, a more comprehensive description of the present disclosure is provided below with reference to the accompanying drawings. Preferred embodiments of the present disclosure are provided in the accompanying drawings. However, the present disclosure can be implemented in different forms and is not limited to the embodiments described here. On the contrary, an objective of providing these embodiments is to provide a more thorough understanding of the disclosed content of the present disclosure.

Unless otherwise defined, all technical and scientific terms used herein have the same meaning as commonly understood by those skilled in the art belonging to the present disclosure. Terms used herein in the specification of the present disclosure are for a purpose of describing specific embodiments only and are not intended to limit the present invention.

Hereinafter, the present disclosure will be described in detail with reference to the accompanying drawings.

Figure 1:
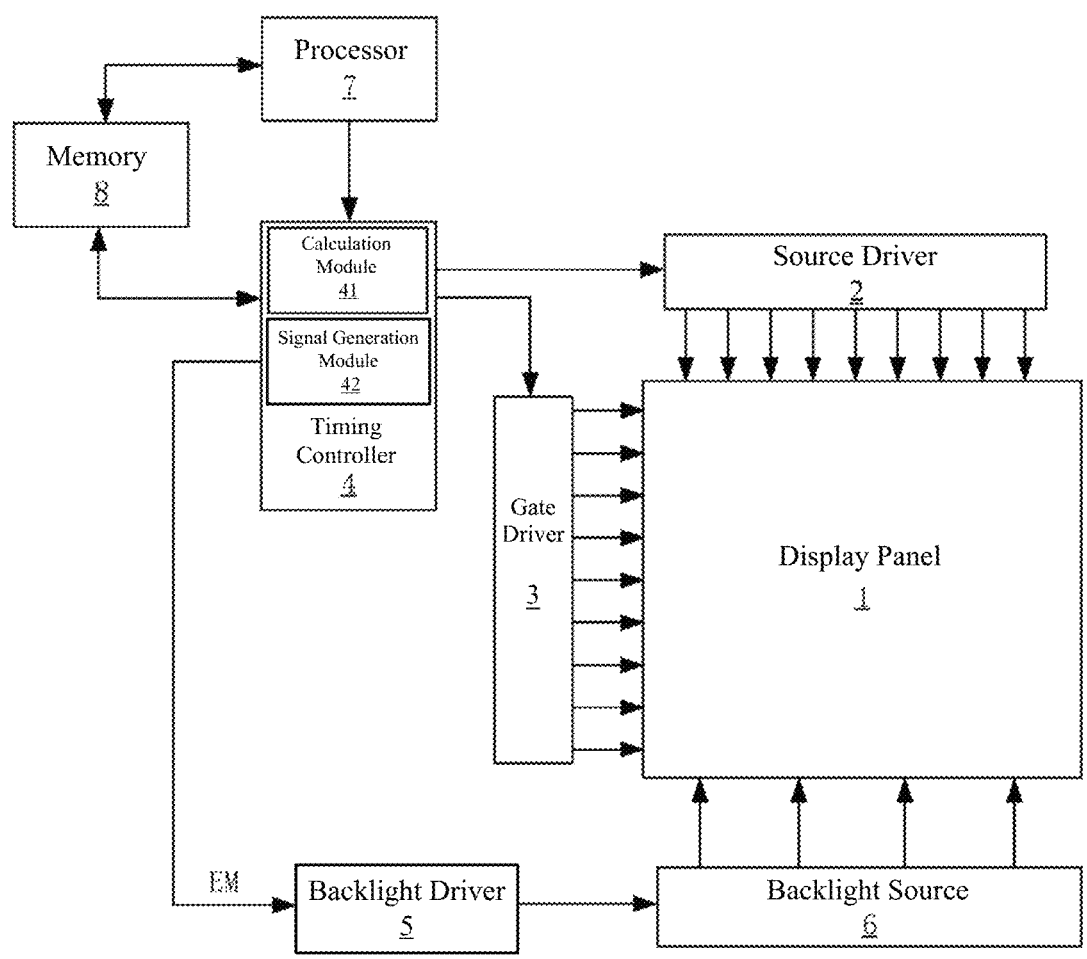
FIG. 1 shows a schematic structural diagram of a display apparatus provided according to an embodiment of the present disclosure.
Figure 2:
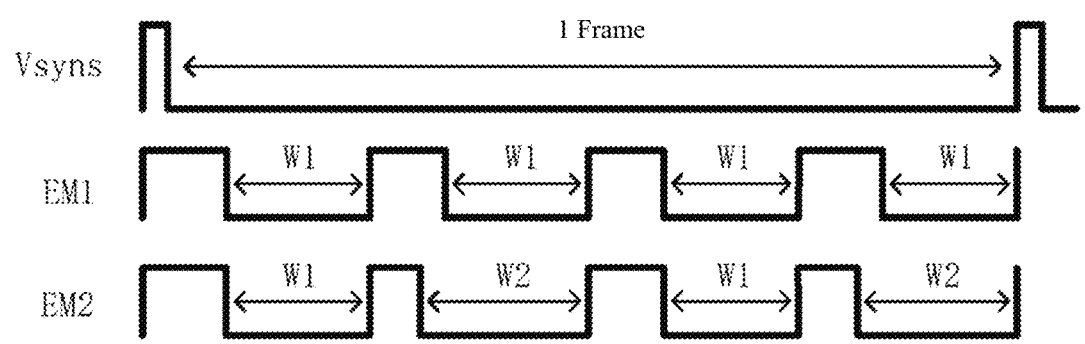
FIG. 2 shows a schematic waveform diagram of a light-emitting control signal within one frame period provided according to an embodiment of the present disclosure.

FIG. 1 shows a structural schematic diagram of a display apparatus provided according to an embodiment of the present disclosure; and FIG. 2 shows a waveform schematic diagram of a light-emitting control signal within one frame period provided according to an embodiment of the present disclosure.

As shown in FIG. 1, in this embodiment, the display apparatus 100 includes a display panel 1, a source driver 2, a gate driver 3, a backlight source 6 and a brightness adjustment device.

The display panel 1 includes a plurality of scan lines, a plurality of data lines, and a plurality of pixel cells located at intersecting positions of the plurality of scan lines and the plurality of data lines, each pixel cell respectively includes a thin film transistor and a pixel electrode. Gate electrodes of thin film transistors of pixel cells located in a same row are connected to a same scan line, and source electrodes of thin film transistors of pixel cells located in a same column are connected to a same data line.

Further, the display panel further includes the backlight source 6, in which a plurality of light emitting diodes are arranged in an array, and the plurality of light emitting diodes are used to provide backlight brightness for the plurality of pixel cells in the display panel when emitting light. Optionally, the plurality of light emitting diodes of the backlight source 6 correspond to the plurality of pixel cells in the display panel 1, respectively, for example, a row of light emitting diodes in the backlight source 6 corresponds to a row of pixel cells in the display panel 1.

The source driver 2 is connected to the plurality of data lines for applying a gray-scale voltage corresponding to a gray-scale driving signal to a corresponding thin film transistor via the data lines.

The gate driver 3 is connected to the plurality of scan lines for providing gate signals, so that the plurality of scan lines are sequentially scanned in each frame period, so as to turn on corresponding thin film transistors.

The brightness adjustment device is connected to the backlight source 6 for supplying a driving current to the backlight source 6 to control the light emission of the backlight source 6.

As shown in FIG. 2, in this embodiment, the brightness adjustment device further includes a processor 7, a timing controller 4 and a backlight driver 5.

The processor 7 is used for generating brightness adjustment instructions and a target display brightness value of the display panel according to a user instruction or data obtained by sensing external environment.

Optionally, the processor 7 may, after receiving an operation instruction (such as a touch instruction or an information input instruction of a user), obtain the target display brightness value information of the display panel, which is set or desired by the user, and generate a brightness adjustment instruction by analyzing the user's instruction, thereby the user can realize active adjustment on backlight brightness of the display panel.

Optionally, the processor 7 may also be connected to, for example, an optical sensor in the display apparatus 100, for receiving and analyzing a sensing result of external ambient light obtained by the optical sensor, so as to generate a brightness adjustment instruction in a case that a brightness change of the external ambient light is sensed by the optical sensor, and at the same time, analyze the sensing result of the external ambient light obtained by the optical sensor to obtain an optimum display brightness value (i.e., the target display brightness value) of the display panel under the current external ambient light.

The timing controller 4 is connected to the processor 7. On one hand, the timing controller 4 is also connected to the source driver 2 and the gate driver 3, respectively, for providing a plurality of switching signals SW (1, 2, 3, . . . , n), and providing a horizontal synchronization signal Vsyns, a start signal STV, and a plurality of clock signals CLK (1, 2, 3, . . . , n) to the gate driver 4.

Further, the processor 7 is configured to scale image data inputted from an external data source according to a resolution of the display panel, and supply the image data together with a plurality of synchronization signals to the timing controller 4. The plurality of synchronization signals at least includes a clock enable signal and a data enable signal, and may further include a horizontal synchronization signal and a vertical synchronization signal. The timing controller 4 is configured to perform correction on the image data inputted from the processor 7 using various data processing methods that improve image quality and reduce power consumption, and supply a corresponding gray-scale driving signal to the source driver 2.

Further, the timing controller 4 is also used to generate timing signals for controlling the timing of the source driver 2 and the gate driver 3 in accordance with the plurality of synchronization signals inputted from the processor 7. The timing signals includes, for example, a source start pulse and a source sample pulse for controlling data signal latching of the source driver 2, a polarity control signal for controlling polarity of a data signal, an enable signal for controlling an output cycle of a data signal, etc. The timing signals may also include a start pulse signal and a shift clock for controlling gate signal scanning of the gate driver 3, and an enable signal for controlling an output cycle of a gate signal, etc.

On the other hand, the timing controller 4 may also be connected to the backlight driver 5 for supplying the light-emitting control signal EM, which may be a pulse width modulation signal and have a certain duty cycle, to the backlight driver 5.

The timing controller 4 may receive the target display brightness value of the display panel and the brightness adjustment instruction provided by the processor 7, adjust a duty cycle of the output light-emitting control signal according to the received brightness adjustment instruction and the target display brightness value of the display panel. The backlight driver 5 may receive the adjusted light-emitting control signal provided by the timing controller to generate a corresponding driving current, which is used to drive the backlight source 6 to emit light and control the luminous brightness of the backlight source 6.

Further, when the display panel displays each frame image, for each row of light emitting diodes in the backlight source of the display panel, the light-emitting control signal EM, which is correspondingly received by that row of light emitting diodes, includes N pulse cycles, where N is a positive integer greater than 2. According to the embodiments of the present disclosure, each time a duty cycle of the light-emitting control signal EM needs to be adjusted, a duty cycle of each of a part of the N pulse cycles of the light-emitting control signal EM is selected to be correspondingly adjusted, wherein, the number of the selected part of the N pulse cycles is greater than one and less than N. Thus, the backlight brightness adjustment accuracy of the display panel can be improved, and the adjustable range of the backlight brightness of the display panel can be ensured to be wider.

Further, in the present embodiment, the timing controller 4 further includes a calculation module 41 and a signal generation module 42. The calculation module 41 is configured to calculate the duty cycle or the low-voltage-level duration of each pulse cycle of the output light-emitting control signal EM according to the target display brightness value of the display panel 1. The signal generation module 42 is connected to the calculation unit 41, and is configured to generate a final light-emitting control signal EM according to a calculation result obtained by the calculation module 41.

Further, in this embodiment, the brightness adjustment device also includes a memory 8. The memory 8 is connected to the processor 7 and the timing controller 4, respectively, and is configured to establish and store a mapping relationship between a display brightness value and a duty cycle of the corresponding light-emitting control signal. Therefore, when the target display brightness value, to which the backlight brightness of the display panel needs to be adjusted in a subsequent procedure, is a value that has already been stored, a duty cycle of the corresponding light-emitting control signal can be directly looked up and read from the memory, thereby omitting a calculation process, saving operation resources of the device and improving adjustment speed.

As shown in FIG. 2, in this embodiment, the display panel is set to display a frame image within a frame period of the horizontal synchronization signal Vsyns, where EM1 represents the light-emitting control signal before adjustment, EM2 represents the light-emitting control signal after adjustment, W1 and W2 are each used to represent low-voltage-level duration of a corresponding pulse cycle of the light-emitting control signal, and each can be further used to represent the duty cycle of the corresponding pulse cycle of the light-emitting control signal. Referring to FIG. 2, it can be seen that in one frame period of the horizontal synchronization signal Vsyns, if the low-voltage-level duration of each of the N pulse cycles of the light-emitting control signal EM1 before adjustment is W1, that is, each of the pulse cycles of the light-emitting control signal EM1 before adjustment has a first duty cycle at this time, then, in the N pulse cycles of the light-emitting control signal EM2 after being adjusted according to the technical scheme of the present disclosure, only a part of the N pulse cycles is changed, as shown in FIG. 2, only a duty cycle of each even-numbered pulse cycle is changed, so that each odd-numbered pulse cycle has a first duty cycle and each even-numbered pulse cycle has a second duty cycle. Thus, an objective of changing a magnitude of the driving current output by the backlight driver 5 can be achieved, and an objective of adjusting the backlight brightness of the display panel 1 can be further achieved. At the same time, since the number of pulse cycles to be changed each time may be greater than 1, an adjustable range of backlight brightness of the display panel can be wider.

It can be understood that, according to a technical scheme disclosed by the present disclosure, each time the duty cycle of the light-emitting control signal EM is required to be adjusted, performing duty-cycle adjustment on the selected part of the N pulse cycles of the light-emitting control signal EM includes but is not limited to adjusting the low-voltage-level duration of even-numbered pulse cycles as shown in FIG. 2; in another embodiment of the present disclosure, the selected part of the N pulse cycles may also be the odd-numbered pulse cycles of the N pulse cycles, or one or more consecutive pulse cycle of the N pulse cycles, or randomly selected pulse cycles, etc., as long as the number of pulse cycles to be adjusted each time is greater than 1 and less than N. At the same time, in a case that the light-emitting control signal EM needs to be adjusted several times (for example, the light-emitting control signals received by corresponding two adjacent rows of light emitting diodes in the backlight source are respectively adjusted, or brightness adjustment is performed on two adjacent frames of display images), pulse cycles that are adjusted in two adjacent times of adjustment may have same positions correspondingly, or may at least be positioned differently, which is not limited by the present disclosure.

It should be further noted that, according to the above-mentioned description, if the odd-numbered pulse cycles or the even-numbered pulse cycles are taken as the part of the N pulse cycles of the light-emitting control signal to be adjusted, stability of subsequent driving based on the light-emitting control signal can be ensured, and further, since the frequency of the light-emitting control signal is repeatedly dithered and changed in odd and even cycles within one frame period, electromagnetic interference can be effectively suppressed from the source. If it is set that the part of the light-emitting control signal to be adjusted are continuous pulse cycles, times of repeatedly adjusting the duty cycle can be reduced correspondingly, and adjustment difficulty and power consumption can also be reduced.

Further, if the duty cycle of each pulse cycle of the part of the N pulse cycles of the light-emitting control signal needs to be increased, it may be preferable to select and adjust a pulse cycle with a low duty cycle, and if the duty cycle of each pulse cycle of the part of the N pulse cycles of the light-emitting control signal needs to be reduced, it may be preferable to select and adjust a pulse cycle with a high duty cycle. In this way, it is beneficial to maintain balance among N pulse cycles of the light-emitting control signal in one frame period, thereby improving driving quality of the backlight source in the display panel and enhancing display effect.

It should be noted that changing a duty cycle of a pulse cycle and changing a low-voltage-level duration of the pulse cycle described herein are intended to express a same meaning, therefore should not be considered as a limitation or to negation to the present disclosure.

Figure 3:
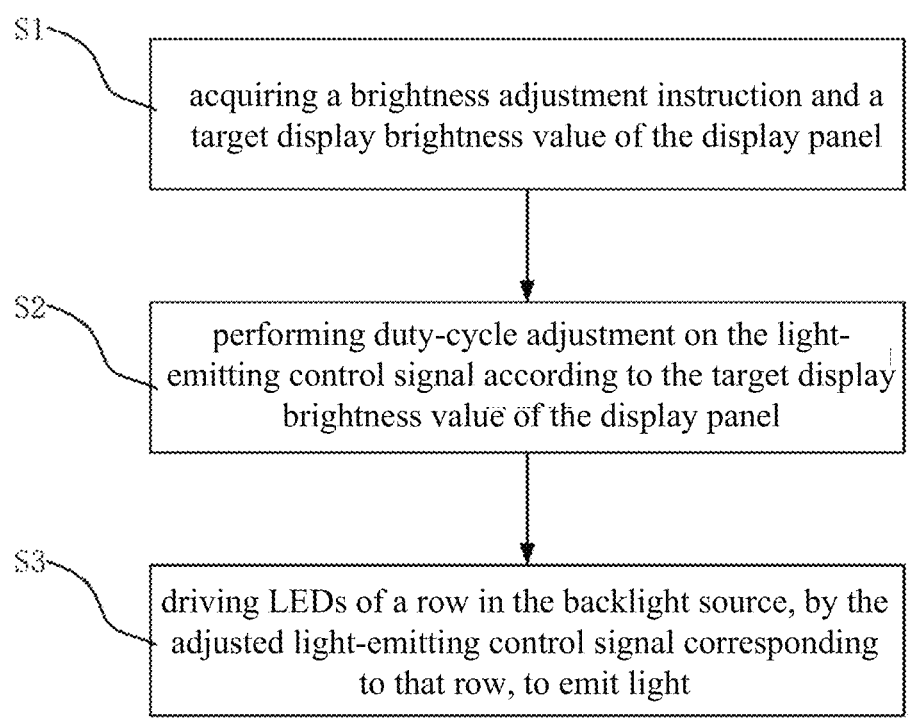
FIG. 3 shows a flowchart of a brightness adjustment method provided according to an embodiment of the present disclosure.

FIG. 3 shows a flowchart of a brightness adjustment method provided according to an embodiment of the present disclosure.

As shown in FIG. 3, in this embodiment, the brightness adjustment method can be applied to the brightness adjustment device and the display apparatus as shown in FIGS. 1 and 2. The brightness adjustment method may include executing steps S1 to S3.

Specifically, in Step S1, a brightness adjustment instruction and a target display brightness value of the display panel are acquired.

In the embodiment, acquiring the brightness adjustment instruction and the target display brightness value of the display panel includes: generating the brightness adjustment instruction according to an operation instruction of a user, and taking a display brightness value set by the user as the target display brightness value of the display panel; or, generating the brightness adjustment instruction according to a brightness variation of external ambient light, and generating the target display brightness value of the display panel according to sensed brightness of external ambient light.

Referring to FIG. 1, if an instruction for backlight brightness adjustment of the display panel is actively issued by the user, after the operation instruction issued by the user through touch control or information input is received by a processor, by analyzing user's instruction, information, that contained in the user's operation instruction, of the target display brightness value as set or desired by the user of the display panel can be acquired and the brightness adjustment instruction can be generated. The processor may generate the corresponding brightness adjustment instruction and the target display brightness value of the display panel, which is helpful to realize active adjustment on backlight brightness of the display panel.

If an instruction for backlight brightness adjustment of the display panel is required after an automatic brightness adjustment command is set by the user, the brightness adjustment instruction may be generated by a processor according to brightness variation of external ambient light sensed by a device such as an optical sensor in the display apparatus, the processor can receive and analyze the sensing result of the external ambient light obtained by the optical sensor, in order to obtain an optimum display brightness value (i.e., the target display brightness value) of the display panel under the current external ambient light, and then generate the corresponding brightness adjustment instruction and the target display brightness value of the display panel, which is helpful to realize intelligent adjustment on backlight brightness of the display panel.

It should be noted that, in the present disclosure, the above-mentioned display brightness value is used to represent the backlight brightness of the display panel.

In Step S2, duty-cycle adjustment is performed on the light-emitting control signal according to the target display brightness value of the display panel.

Based on the above-mentioned description referring to FIGS. 1 and 2, in this embodiment, when the display panel displays each frame image, for each row of light emitting diodes in the backlight source of the display panel, the light-emitting control signal which is received by that corresponding row of light emitting diodes includes N pulse cycles, where N is a positive integer greater than 2. Further, performing duty-cycle adjustment of the light-emitting control signal according to the target display brightness value of the display panel includes: each time the duty-cycle adjustment of the light-emitting control signal needs to be performed, performing corresponding adjustment on a duty cycle of each pulse cycle of a selected part of the N pulse cycles of the light-emitting control signal. In this way, under a condition that the number of lines of light emitting diodes in the backlight source to be adjusted is unchanged, compared with the prior art, the number of pulse cycles to be adjusted corresponding to each row can be reduced, and then an adjustment quantity corresponding to an overall brightness of the whole display panel can be correspondingly reduced every time a duty cycle of a unit of light-emitting control signal is adjusted, thus effectively improving backlight brightness adjustment accuracy of the display panel. At the same time, since only the duty cycle of each pulse cycle of a part (may include more than 1 pulse cycle) of the N pulse cycles is adjusted each time, an adjustable range of the backlight brightness of the display panel can be wider, compared with a situation that only a duty cycle of a single pulse cycle in one frame is changed.

Further, in an embodiment of the present disclosure, the step of performing corresponding adjustment on a duty cycle of each pulse cycle of the selected part of the N pulse cycles of the light-emitting control signal includes: selecting odd-numbered pulse cycles or even-numbered pulse cycles of the N pulse cycles of the light-emitting control signal as the selected part of the N pulse cycles of the light-emitting control signal, and performing corresponding adjustment on a duty cycle of each pulse cycle of the selected part of the N pulse cycles of the light-emitting control signal. At the same time, according to a technical scheme of the present embodiment, it can be set that the part of the pulse cycles, that are selected and required for corresponding adjustment and corresponds to light emitting diodes in each of adjacent rows in the backlight source, may only include odd-numbered pulse cycles or only include even-numbered pulse cycles; or it can be set that the part of the pulse cycles, that is selected and required for corresponding adjustment and corresponds to one of the adjacent rows of light emitting diodes in the backlight source may only include odd-numbered pulse cycles, and the part of the pulse cycles, that is selected and required for corresponding adjustment and corresponds to the other one of the adjacent rows of light emitting diodes in the backlight source may only include even-numbered pulse cycles.

Referring to FIGS. 1 and 2, by taking the light-emitting control signal containing four pulse cycles in one frame period of the signal Vsyns as an example, if the low-voltage-level duration of each pulse cycle of the light-emitting control signal EM1 before adjustment is W1, and after calculation, it is necessary to adjust the low-voltage-level duration of each pulse cycle of a part of the pulse cycles of the light-emitting control signal EM1 to W2 to adjust the duty cycle of the light-emitting control signal (in a pulse cycle, since a total duration of the pulse cycle is unchanged, if the low-voltage-level duration is changed, the corresponding duty cycle will also change), in this case, the light-emitting control signal received by a corresponding row of the backlight source can be adjusted, by keeping the low-voltage-level duration of a first pulse cycle and the low-voltage-level duration of a third pulse cycle of the light-emitting control signal EM1, which corresponds to that row, constant at W1, and only adjusting the low-voltage-level duration of a second pulse cycle and the low-voltage-level duration of a fourth pulse cycle of the light-emitting control signal EM1 to W2. Meanwhile, for adjusting the light-emitting control signals received by two adjacent rows in the backlight source, only the low-voltage-level durations of the second pulse cycle and the fourth pulse cycle of the light-emitting control signals EM1 corresponding to the two adjacent rows may be adjusted to W2, respectively; or, the low-voltage-level durations of the second pulse cycle and the fourth pulse cycle of the light-emitting control signal EM1 corresponding to a first row of the two adjacent rows may be adjusted to W2, and the low-voltage-level durations of the first pulse cycle and the third pulse cycle of the light-emitting control signal EM1 corresponding to a second row of the two adjacent rows may be adjusted to W2. In this way, stability of subsequent driving based on the light-emitting control signal can be ensured, and further, since the frequency of the light-emitting control signal is repeatedly dithered and changed in odd and even cycles within one frame period, electromagnetic interference can be effectively suppressed from the source. It should be noted that, in this embodiment, when the light-emitting control signal includes only three pulse cycles in one frame period of the signal Vsyns, only the duty cycle of each odd-numbered pulse cycle (i.e., the first and the third pulse cycles) is adjusted to ensure that the number of pulse cycles to be adjusted each time is greater than 1 and less than N (N=3).

In another embodiment of the present disclosure, the step of performing corresponding adjustment on a duty cycle of each pulse cycle of the selected part of the N pulse cycles of the light-emitting control signal includes: selecting i-th pulse cycle to k-th pulse cycle of the N pulse cycles of the light-emitting control signal as the selected part of the N pulse cycles of the light-emitting control signal, and performing corresponding adjustment on a duty cycle of each pulse cycle of the selected part of the N pulse cycles of the light-emitting control signal, where i is a positive integer greater than or equal to 1, k is a positive integer greater than i and less than or equal to N, and k-i is less than N−1. At the same time, according to a technical scheme of the present embodiment, it can be set that the parts of the pulse cycles, that are selected and required for corresponding adjustment and correspond to light emitting diodes in adjacent rows in the backlight source, may each include the i-th pulse cycle to the k-th pulse cycle; or it can be set that the part of the pulse cycles, that is selected and required for corresponding adjustment and corresponds to one of the adjacent rows of light emitting diodes in the backlight source may include the i-th pulse cycle to the k-th pulse cycle, and the part of the pulse cycles, that is selected and required for corresponding adjustment and corresponds to the other one of the adjacent rows of light emitting diodes in the backlight source may include (i+m)-th pulse cycle to (k+m)-th pulse cycle, where m is an integer, and (i+m) is greater than or equal to 1, and (k+m) is less than or equal to N.

Referring to FIGS. 1 and 2, by taking the light-emitting control signal containing four pulse cycles in one frame period of the signal Vsyns as an example, if the low-voltage-level duration of each pulse cycle of the light-emitting control signal EM1 before adjustment is W1, and after calculation, it is necessary to adjust the low-voltage-level duration of part of the pulse cycle of the light-emitting control signal EM1 to W2 to adjust the duty cycle of the light-emitting control signal, for example, the light-emitting control signal includes four pulse cycles in one frame period of the signal Vsyns, in this case, the light-emitting control signal received by a corresponding row of the backlight source can be adjusted, by keeping the low-voltage-level duration from a first pulse cycle to a second/third pulse cycle of the light-emitting control signal EM1, which corresponds to that row, constant at W1, and only adjusting the low-voltage-level duration from the second pulse cycle to the third/fourth pulse cycle of the light-emitting control signal EM1 to W2. Meanwhile, for adjusting the light-emitting control signals received by two adjacent rows in the backlight source, only the low-voltage-level duration of the second pulse cycle to the third/fourth pulse cycle of the light-emitting control signals EM1 corresponding to the two adjacent rows may be adjusted to W2, respectively; or, the low-voltage-level duration of the first pulse cycle to the second pulse cycle of the light-emitting control signal EM1 corresponding to a first row of the two adjacent rows may be adjusted to W2, and the low-voltage-level duration of the second pulse cycle to the third pulse cycle or the third pulse cycle to the fourth pulse cycle of the light-emitting control signal EM1 corresponding to a second row of the two adjacent rows may be adjusted to W2. In this way, times of repeatedly adjusting the duty cycle can be reduced, and adjustment difficulty and power consumption can also be reduced.

In another embodiment of the present disclosure, the step of performing corresponding adjustment on a duty cycle of each pulse cycle of the selected part of the N pulse cycles of the light-emitting control signal includes: selecting each of the N pulse cycles of the light-emitting control signal that has a duty cycle less than a first threshold value or greater than a second threshold value as the selected part of the N pulse cycles of the light-emitting control signal, and performing corresponding adjustment on a duty cycle of each pulse cycle of the selected part of the N pulse cycles of the light-emitting control signal. A method for setting the first threshold value may comprise following steps: sorting duty cycles of the N pulse cycles in an order from high to low, selecting a j-th one of the duty cycles of the N pulse cycles in the order as the first threshold value. A method for setting the second threshold value may comprise following steps: sorting duty cycles of the N pulse cycles in an order from low to high, and selecting a j-th one of the duty cycles of N pulse cycles in the order as the second threshold value, where j is a positive integer less than N−1. Specifically, if a duty cycle of partial pulse signals of the light-emitting control signal needs to be increased, a duty cycle of a pulse cycle whose duty cycle is less than the first threshold value among N pulse cycles of the light-emitting control signal is adjusted correspondingly; if a duty cycle of partial pulse signals of the light-emitting control signal needs to be reduced, a duty cycle of a pulse cycle whose duty cycle is greater than the second threshold value among the N pulse cycles of the light-emitting control signal is adjusted correspondingly.

Referring to FIGS. 1 and 2, by taking the light-emitting control signal containing four pulse cycles in one frame period of the signal Vsyns as an example, if respective low-voltage-level durations of the four pulse cycles of the light-emitting control signal EM1 before adjustment are arranged in an order from high to low as a first pulse cycle, a second pulse cycle, a third pulse cycle and a fourth pulse cycle, and after calculation, the low-voltage-level duration of each pulse cycle of the part of the four pulse cycles of the light-emitting control signal EM1 need to be adjusted by a specific value so that the duty cycle of the light-emitting control signal can be adjusted, at this time, if a duty cycle of the light-emitting control signal received by a certain row of the backlight source needs to be increased, a duty cycle of the second pulse cycle can be used as the first threshold value, low-voltage-level durations of the first pulse cycle and the second pulse cycle, which are greater than or equal to the first threshold value in the light-emitting control signal EM1 corresponding to that row may keep unchanged, and only the low-voltage-level durations of the third pulse cycle and the fourth pulse cycle which are less than the first threshold value in the light-emitting control signal EM1 may be increased by a specific value. If the duty cycle of the light-emitting control signal received by a certain row in the backlight source needs to be reduced, a duty cycle of the third pulse cycle can be used as the second threshold value, the low-voltage-level durations of the third pulse cycle and the fourth pulse cycle which are less than or equal to the second threshold value in the light-emitting control signal EM1 corresponding to that row can keep unchanged, and only the low-voltage-level durations of the first pulse cycle and the second pulse cycle which are greater than the second threshold value in the light-emitting control signal EM1 may be reduced by a specific value. In this way, it is beneficial to maintain balance among N pulse cycles of the light-emitting control signal in one frame period, thereby improving driving quality of the backlight source in the display panel and enhancing display effect.

In another embodiment of the present disclosure, the step of performing corresponding adjustment on a duty cycle of each pulse cycle of the selected part of the N pulse cycles of the light-emitting control signal includes: randomly selecting one or more of the N pulse cycles of the light-emitting control signal as the selected part of the N pulse cycles of the light-emitting control signal, and performing corresponding adjustment on the duty cycle of each pulse cycle of the selected part of the N pulse cycles of the light-emitting control signal. It should be noted that the above-mentioned embodiments are described only as exemplary embodiments, and as long as the number of pulse cycles of the light-emitting control signal to be adjusted each time is greater than 1 and less than N, it should be within the scope of protection of the present invention.

Further, in the display screen of a same frame, the duty cycle of each pulse cycle of the selected part of the N pulse cycles can be correspondingly adjusted by a same adjustment quantity, so as to reduce the difficulty for adjustment.

In Step S3, light emitting diodes of a row in the backlight source are driven, by the adjusted light-emitting control signal corresponding to that row, to emit light.

After the duty cycle or low-voltage-level duration of the light-emitting control signal is adjusted according to the above-mentioned steps, the adjusted light-emitting control signal is output to the backlight driver, so that a corresponding driving current can be generated, and then the light emitting diodes of a corresponding row of the backlight source in the display panel can be driven by the driving current to emit light, thereby completing the adjustment of the backlight brightness (i.e., the screen brightness) of the display panel.

To sum up, according to embodiments of the present disclosure, when a duty cycle of a light-emitting control signal received by a backlight source of the display panel is adjusted based on a brightness adjustment instruction and a target display brightness value to realize brightness adjustment of the display panel, a duty cycle of each of only a part of the N pulse cycles of the light-emitting control signal is adjusted each time, therefore, under a condition that the number of lines of light emitting diodes in the backlight source to be adjusted is unchanged, compared with the prior art, the number of pulse cycles to be adjusted corresponding to each row can be reduced, and then an adjustment quantity corresponding to an overall brightness of the whole display panel can be correspondingly reduced every time a duty cycle of a unit of light-emitting control signal is adjusted, thus effectively improving backlight brightness adjustment accuracy of the display panel. At the same time, since only the duty cycle of each pulse cycle of the part (may include more than 1 pulse cycle) of the N pulse cycles is adjusted each time, an adjustable range of the backlight brightness of the display panel can be wider, compared with a situation that only a duty cycle of a single pulse cycle in one frame is changed.

It should be understood that, in the present disclosure, terms "including", "comprising" or any other variation thereof are intended to encompass non-exclusive inclusion, so that a process, method, article or equipment including a set of elements, may not only include those elements, but may also include other elements that are not explicitly listed, or may further include elements inherent to such process, method, article or equipment. In the absence of more limitations, an element limited by a statement "comprises a . . . " does not preclude an existence of another identical element in the process, method, article or equipment including said element.

Finally, it should be noted that, obviously, the above embodiments are merely examples to clearly illustrate the present disclosure and are not limitations on implementations. For persons of ordinary skills in the art, other variations or variations can be made on the basis of the above description, and are not necessary and cannot be exhaustive here. Any apparent change or alteration arising therefrom remains within the scope of the present disclosure.

What is claimed is:

1. A brightness adjustment method, comprising:
acquiring a brightness adjustment instruction and a target display brightness value of a display panel, the display brightness value being used to represent backlight brightness of the display panel;
adjusting a duty cycle of a light-emitting control signal based on the target display brightness value of the display panel;
driving LEDs of a corresponding row in a backlight source to emit light by use of the adjusted light-emitting control signal, wherein for each row of LEDs in the backlight source of the display panel, the light-emitting control signal corresponding to that row of LEDs comprises N pulse cycles; and
each time the duty cycle of the light-emitting control signal needs to be adjusted, performing corresponding adjustment on a duty cycle of each pulse cycle of a selected part of the N pulse cycles of the light-emitting control signal, within a corresponding to-be-adjusted frame period,
wherein,
N is a positive integer greater than 2; and
during the corresponding to-be-adjusted frame period together with an adjacent frame period before the corresponding to-be-adjusted frame period, a duty cycle of the at least one of the N pulse cycles of the light-emitting control signal is prevented from being adjusted.

2. The brightness adjustment method according to claim 1, wherein, step of performing corresponding adjustment on the duty cycle of each pulse cycle of the selected part of the N pulse cycles of the light-emitting control signal comprises:
selecting each odd-numbered pulse cycle or each even-numbered pulse cycle of the N pulse cycles of the light-emitting control signal as the selected part of the N pulse cycles of the light-emitting control signal, and performing corresponding adjustment on the duty cycle of each pulse cycle of the selected part of the N pulse cycles of the light-emitting control signal.

3. The brightness adjustment method according to claim 1, wherein, step of performing corresponding adjustment on the duty cycle of each pulse cycle of the selected part of the N pulse cycles of the light-emitting control signal comprises:
selecting i-th pulse cycle to k-th pulse cycle of the N pulse cycles of the light-emitting control signal as the selected part of the N pulse cycles of the light-emitting control signal, and performing corresponding adjustment on the duty cycle of each pulse cycle of the selected part of the N pulse cycles,
wherein i is a positive integer greater than or equal to 1, k is a positive integer greater than i and less than or equal to N, and k−i is less than N−1.

4. The brightness adjustment method according to claim 1, wherein step of performing corresponding adjustment on the duty cycle of each pulse cycle of the selected part of the N pulse cycles of the light-emitting control signal comprises:
selecting a pulse cycle, which has a duty cycle less than a first threshold value or greater than a second threshold value, of the N pulse cycles of the light-emitting control signal as the selected part of the N pulse cycles of the light-emitting control signal, and performing corresponding adjustment on the duty cycle of each pulse cycle of the selected part of the N pulse cycles,
wherein a method for setting the first threshold value comprises: sorting duty cycles of the N pulse cycles in an order from high to low, and selecting a duty cycle of a j-th pulse cycle in that order as the first threshold value;
wherein a method for setting the second threshold value comprises: sorting the duty cycles of the N pulse cycles in an order from low to high, and selecting a duty cycle of a j-th pulse cycle in that order as the second threshold value, where j is a positive integer less than N−1.

5. The brightness adjustment method according to claim 1, wherein step of performing corresponding adjustment on the duty cycle of each pulse cycle of the selected part of the N pulse cycles of the light-emitting control signal comprises:
randomly selecting a part of the N pulse cycles as the selected part of the N pulse cycles of the light-emitting control signal, and performing corresponding adjustment on the duty cycle of each pulse cycle of the selected part of the N pulse cycles.

6. The brightness adjustment method according to claim 2, wherein,
the selected part of the N pulse cycles required for corresponding adjustment and corresponding to LEDs of each of adjacent rows in the backlight source are odd-numbered pulse cycles or even-numbered pulse cycles; or
the selected part of the N pulse cycles required for corresponding adjustment and corresponding to one of the adjacent rows of LEDs in the backlight source are odd-numbered pulse cycles, and the selected part of the N pulse cycle required for corresponding adjustment and corresponding to the other one of the adjacent rows of LEDs in the backlight source are even-numbered pulse cycles.

7. The brightness adjustment method according to claim 3, wherein,
the selected part of the N pulse cycles required for corresponding adjustment and corresponding to LEDs of each of adjacent rows in the backlight source are from i-th pulse cycle to k-th pulse cycle; or
the selected part of the N pulse cycles required for corresponding adjustment and corresponding to LEDs of one of the adjacent rows of LEDs in the backlight source are from the i-th pulse cycle to the k-th pulse cycle, and the selected part of the N pulse cycles required for corresponding adjustment and corresponding to LEDs of the other one of the adjacent rows are from (i+m)-th pulse cycle to (k+m)-th pulse cycle,
where m is an integer, (i+m) is greater than or equal to 1, and (k+m) is less than or equal to N.

8. The brightness adjustment method according to claim 1, wherein the duty cycle of each pulse cycle of the selected part of the N pulse cycles for corresponding adjustment is adjusted by a same adjustment quantity.

9. The brightness adjustment method according to claim 1, wherein step of acquiring the brightness adjustment instruction and the target display brightness value of the display panel comprises:
generating the brightness adjustment instruction according to an operation instruction of a user, and taking a display brightness value set by the user as the target display brightness value of the display panel; or generating the brightness adjustment instruction according to brightness variation of external ambient light, and generating the target display brightness value of the display panel according to sensed brightness of the external ambient light.

10. A brightness adjustment device used for executing the brightness adjustment method according to claim 1, wherein, when the display panel displays each frame image, for each row of light emitting diodes in the backlight source of the display panel, the light-emitting control signal received by that row comprises N pulse cycles, N is a positive integer greater than 2, and the brightness adjustment device comprises:

a processor, configured to generate the brightness adjustment instruction and the target display brightness value of the display panel;

a timing controller, connected with the processor, and configured to receive the brightness adjustment instruction and the target display brightness value, and adjust the duty cycle of the outputted light-emitting control signal according to the brightness adjustment instruction and the target display brightness value;

a backlight driver, connected with the controller, and configured to receive the adjusted light-emitting control signal, so as to generate a corresponding driving current, which is used to drive the backlight source to emit light, wherein, each time the duty cycle of the light-emitting control signal needs to be adjusted, corresponding adjustment is performed on a duty cycle of each pulse cycle of a selected part of the N pulse cycles of the light-emitting control signal.

11. The brightness adjustment device according to claim 10, wherein the timing controller, configured to:

calculate a duty cycle of each pulse cycle of the outputted light-emitting control signal according to the target display brightness value of the display panel, so as to obtain a calculation result; and generate the light-emitting control signal according to the calculation result.

12. The brightness adjustment device according to claim 10, further comprising:

a memory, respectively connected with the processor and the timing controller, and configured to establish and store a mapping relationship between a duty cycle of the light-emitting control signal and a corresponding display brightness value.

13. A display apparatus, comprising: the brightness adjustment device according to claim 10.

14. The brightness adjustment method according to claim 1, wherein, for each time the duty cycle of the light-emitting control signal needs to be adjusted, the at least one of the N pulse cycles of the light-emitting control signal that has the duty cycle prevented from being adjusted comprises a pulse cycle that has a maximum/minimum duty cycle among the N pulse cycles of the light-emitting control signal, within the corresponding to-be-adjusted frame period.

* * * * *